(12) United States Patent
Shi et al.

(10) Patent No.: US 11,770,077 B2
(45) Date of Patent: Sep. 26, 2023

(54) DUAL START CONTROL CIRCUIT FOR AUXILIARY INVERTERS OF RAILWAY VEHICLE

(71) Applicant: CRRC Nanjing Puzhen Co., Ltd., Nanjing (CN)

(72) Inventors: Caixia Shi, Nanjing (CN); Li Yang, Nanjing (CN); Hemin Ding, Nanjing (CN); Xiaofang Shi, Nanjing (CN); Yuhu Jiang, Nanjing (CN); Lian Ge, Nanjing (CN); Qiaofeng Jiang, Nanjing (CN)

(73) Assignee: CRRC Nanjing Puzhen Co., Ltd., Nanjing (CN)

( * ) Notice: Subject to any disclaimer, the term of this patent is extended or adjusted under 35 U.S.C. 154(b) by 253 days.

(21) Appl. No.: 17/436,660

(22) PCT Filed: Nov. 11, 2020

(86) PCT No.: PCT/CN2020/128074
§ 371 (c)(1),
(2) Date: Sep. 7, 2021

(87) PCT Pub. No.: WO2022/082895
PCT Pub. Date: Apr. 28, 2022

(65) Prior Publication Data
US 2022/0329175 A1    Oct. 13, 2022

(30) Foreign Application Priority Data
Oct. 21, 2020   (CN) .......................... 202011130529.7

(51) Int. Cl.
*B60L 1/00*    (2006.01)
*H02M 7/44*    (2006.01)
(Continued)

(52) U.S. Cl.
CPC ............... *H02M 7/44* (2013.01); *B61C 17/00* (2013.01); *H01H 19/12* (2013.01); *H01H 19/14* (2013.01); *H02M 1/36* (2013.01)

(58) Field of Classification Search
CPC ........ B60L 1/00; B60L 2200/26; B60L 55/00; B60R 16/33; B60W 20/10; H01H 19/12; H02M 1/36; F02N 11/12; F02N 11/14
(Continued)

(56) References Cited

U.S. PATENT DOCUMENTS 7,689,331 B2 *   3/2010   Moran ...................... B60L 7/14
                                                           903/914
10,913,358 B2 *   2/2021   Jiang ........................ H02H 3/24

FOREIGN PATENT DOCUMENTS

CN    105711422 A    6/2016
CN    107672609 A    2/2018
(Continued)

*Primary Examiner* — Hai L Nguyen
(74) *Attorney, Agent, or Firm* — Bayramoglu Law Offices LLC

(57) ABSTRACT

A dual start control circuit for auxiliary inverters of a railway vehicle is provided. An external dual circuit is designed for controlling a start and stop of the auxiliary inverters; and an APS START signal is added to start conditions of the auxiliary inverters. When a start-stop switch is turned to an "on" position, an APS start train line is electrified, APS start relays in cabs at both ends are electrified and corresponding normally-open contacts of the APS start relays are closed, a self-locking circuit is kept electrified, the APS start train line is kept electrified, and a start signal is transmitted to the auxiliary inverters through a hard wire; and when the start-stop switch is turned to an "off" position, an APS stop train line is electrified, APS stop relays in the cabs at both ends are electrified and corresponding normally-closed contacts of the APS stop relays are disconnected.

18 Claims, 1 Drawing Sheet

(51) Int. Cl.
  *B61C 17/00* (2006.01)
  *H01H 19/12* (2006.01)
  *H01H 19/14* (2006.01)
  *H02M 1/36* (2007.01)

(58) Field of Classification Search
  USPC .......................................................... 307/9.1
  See application file for complete search history.

(56) References Cited

FOREIGN PATENT DOCUMENTS

| | | |
|---|---|---|
| CN | 109515197 A | 3/2019 |
| CN | 109849696 A | 6/2019 |
| WO | 2016070806 A1 | 5/2016 |

\* cited by examiner

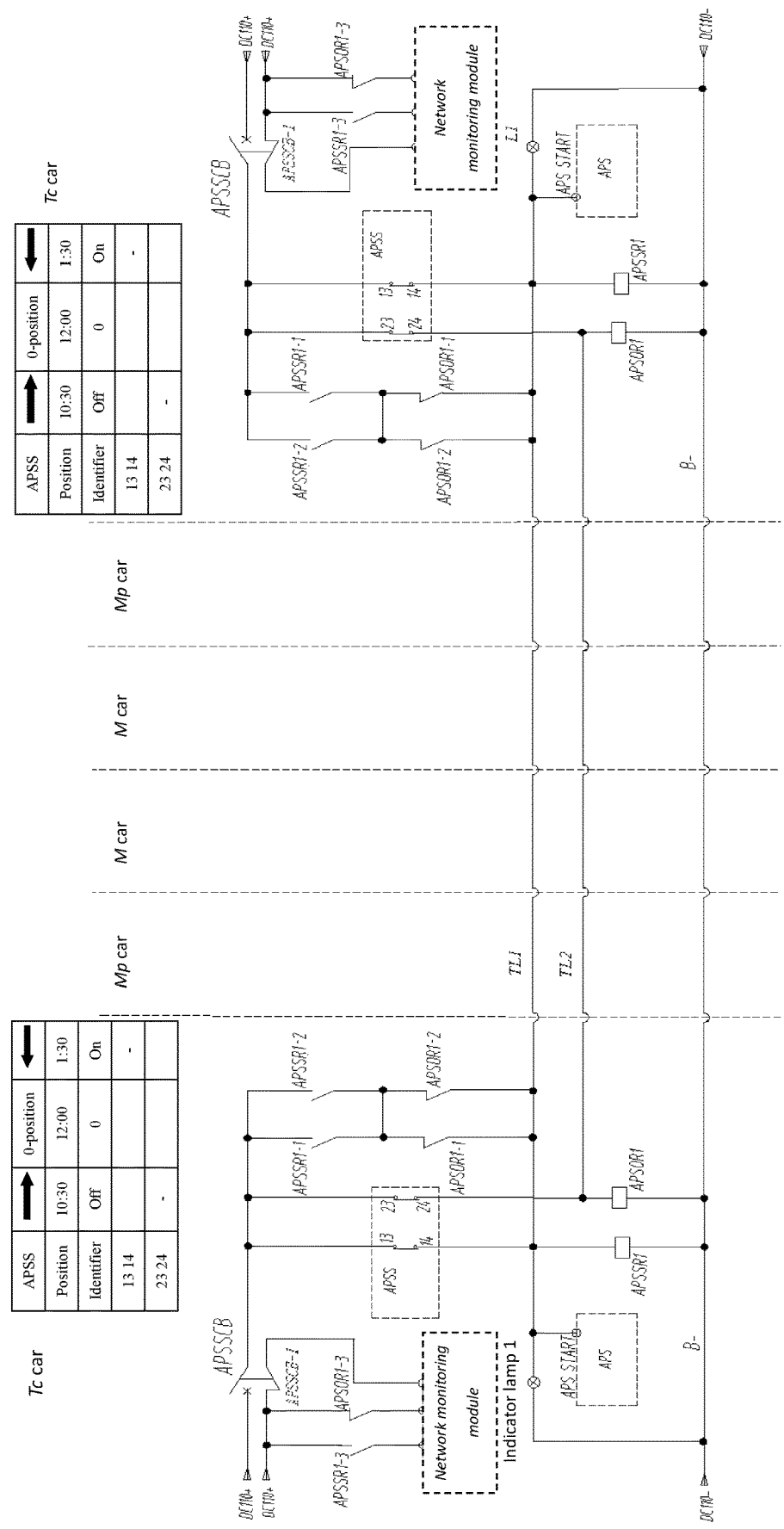

US 11,770,077 B2

DUAL START CONTROL CIRCUIT FOR AUXILIARY INVERTERS OF RAILWAY VEHICLE

CROSS REFERENCE TO THE RELATED APPLICATIONS

This application is the national stage entry of International Application No. PCT/CN2020/128074, filed on Nov. 11, 2020, which is based upon and claims priority to Chinese Patent Application No. 202011130529.7 filed on Oct. 21, 2020, the entire contents of which are incorporated herein by reference.

TECHNICAL FIELD

The present invention relates to a start control circuit for auxiliary inverters of a railway vehicle, and in particular to a dual circuit capable of controlling the start and stop of the auxiliary inverters of the railway vehicle in cabs at both ends, and belongs to the field of control of rail transit electrical systems.

BACKGROUND

Auxiliary inverters provide AC380V, AC220V, DC110V or DC24V power supplies for on-board equipment, and play a key role in the operation of railway vehicles, and the start and stop of the auxiliary inverters are particularly important. In the start-up design of auxiliary inverters, the auxiliary inverters are usually automatically started when a condition is satisfied, and there is no external circuit provided for controlling the start and stop of the auxiliary inverters.

Dual start control for auxiliary inverters means that after two auxiliary inverters are started in the cab of one end, the two auxiliary inverters can be stopped and started in the cab of either end.

The auxiliary inverters are automatically started when the following conditions are met: 1) self-check is performed with no faults; 2) a high voltage is provided; and 3) a DC 110 V control power supply is electrified.

In the existing solution, a driver cannot control the start and stop of the auxiliary inverters when the train is in operation, and the need for separately controlling the start and stop of the auxiliary inverters in special occasions in some projects cannot be met. For example, a train service shop uses a trolley line for power supply in the workshop, and the main line adopts third rail current collection. In the process that a train enters and exits service shop, the trolley line is used for guiding the train, and in such guiding process, the start and stop of the auxiliary inverters need to be controlled in the cabs at both ends. Therefore, there is a need for a control circuit that can conveniently control the start and stop of the auxiliary inverters in the cabs at both ends.

SUMMARY

A main object of the present invention is to solve the problems in the prior art, and provides a dual start control circuit for auxiliary inverters of a railway vehicle.

In order to solve the technical problem described above, the present invention provides a dual start control circuit for auxiliary inverters of a railway vehicle, characterized by comprising two units which are arranged in a front cab and a rear cab, respectively, and an APS start train line (TL1) and an APS stop train line (TL2) which are arranged throughout the whole vehicle, wherein each unit comprises an auxiliary inverter start switch, an APS start relay and an APS stop relay, the auxiliary inverter start switch is a self-reset three-position knob switch and is provided with on-position contacts and off-position contacts, the on-position contacts and the APS start relay are connected in series to a train power supply, the off-position contacts and the APS stop relay are connected in series to the train power supply, a terminal of the APS start train line is connected to a negative pole of the train power supply via an input terminal of the APS start relay and a load, and a terminal of the APS stop train line is connected to a circuit between the off-position contacts of the auxiliary inverter start switch and the APS stop relay; and normally-open contacts of the APS start relay and normally-closed contacts of the APS stop relay are connected in series between the positive pole of the train power supply and the APS start train line, and a start signal interface of the auxiliary inverter is connected to the APS start train line.

Furthermore, the present invention also provides a railway vehicle, characterized by comprising a dual start control circuit for auxiliary inverters of a railway vehicle as described above.

The invention has the following beneficial effects: according to the dual start control circuit for auxiliary inverters provided by the present invention, when two auxiliary inverters are started in the cab of one end, the two APSs can be stopped and started in the cab of either end. The vehicle is provided with a DC 110 V auxiliary inverter start control train line, start-stop switches are provided in the cabs at both ends, and an APS START (auxiliary inverter start) signal is transmitted to the auxiliary inverters through a hard wire.

BRIEF DESCRIPTION OF THE DRAWINGS

FIGURE shows a schematic diagram of a pantograph enable circuit according to the present invention.

DETAILED DESCRIPTION OF THE EMBODIMENTS

Embodiments of the present invention will now be described with reference to the accompanying drawings.

As shown in the FIGURE, the present invention provides a dual start control circuit for auxiliary inverters of a railway vehicle, comprising two units which are arranged in front and rear cabs (TC cars), respectively, and an APS start train line TL1 and an APS stop train line TL2 which are arranged throughout the whole vehicle.

Each unit comprises an auxiliary inverter start switch APSS, an APS start relay APSSR1 and an APS stop relay APSOR1. The auxiliary inverter start switch APSS is a self-reset three-position knob switch, and can be self-reset to a 0-position either when it is switched to an "on" position (1:30) or an "off" position (10:00), and this switch is installed on driver consoles at both ends. The connecting points for the "on" position are 13 and 14, and the connecting points for the "off" position are 23 and 24.

The on-position contacts 13 and 14 and the APS start relay APSSR1 are connected in series to the train power supply, and the off-position contacts 23 and 24 and the APS stop relay APSOR1 are connected in series to the train power supply. A terminal of the APS start train line TL1 is connected to a negative pole of the train power supply via an input terminal of the APS start relay APSSR1 and an indicator lamp L1, and a terminal of the APS stop train line TL2 is connected to a circuit between the off-position contacts 23 and 24 of the auxiliary inverter start switch APSS and the APS stop relay APSOR1. Normally-open contacts APSR1-1 and APSR1-2 of the APS start relay APSR1 and normally-closed contacts APSOR1-1 and APSOR1-2 of the APS stop relay APSOR1 are connected in series between the positive pole of the train power supply and the APS start train line TL1, and a start signal interface APS START of the auxiliary inverter APS is connected to the APS start train line TL1. As shown in the FIGURE, the normally-open contacts APSSR1-1 and APSSR1-2 of the APS start relay APSSR1 and the normally-closed contacts APSOR1-1 and APSOR1-2 of the APS stop relay APSOR1 are connected in series to form a self-locking circuit, and the self-locking circuit adopts double-contact parallel redundancy control. An APS start-stop control circuit breaker APSSCB is connected in series between the positive pole of the train power supply and the auxiliary inverter start switch APSS, and between the positive pole of the train power supply and the normally-open contacts APSSR1-1 and APSSR1-2 of the APS start relay APSSR1.

In this embodiment, the dual start control circuit further comprises a network monitoring module for monitoring the states of the APS start relay APSSR1, the APS stop relay APSOR1 and the APS start-stop control circuit breaker APSSCB. Specifically, the APS start relay APSSR1 has a normally-open contact APSSR1-3 with two ends connected to the positive pole of the train power supply and the network monitoring module, respectively, the APS stop relay (APSOR1) has a normally-closed contact APSOR1-3 with two ends connected to the positive pole of the train power supply and the network monitoring module, respectively, and the APS start-stop control circuit breaker APSSCB has an APS start-stop control circuit breaker auxiliary contact (APSSCB-1) with two ends connected to the positive pole of the train power supply and the network monitoring module, respectively.

When the auxiliary inverter start-stop switch APSS on the local side is turned to the "on" position, the APS start train line TL1 is electrified, the APS start relays APSSR1 at both ends of the vehicle are electrified and the corresponding normally-open auxiliary contacts APSSR1-1 and APSSR-2 are closed, the APS stop relay APSOR1 is not electrified and the corresponding normally-closed auxiliary contacts APSOR1-1 and APSOR-2 of the APS stop relay APSOR1 are kept closed, the APS start train line TL1 is kept electrified, the indicator lamp L1 on the driver console is kept illuminated, and at the same time, an APS start train line signal is transmitted to the auxiliary inverters APS through a hard wire, and the auxiliary inverters APS receive an APS START signal to execute a start program.

The start conditions and process of the auxiliary inverter are as follows:

The start conditions include:
1) no fault occurs;
2) the input voltage is higher than DC 950 V;
3) the DC 110 V control power supply is powered on; and
4) the APS START signal is at the high level 1.

The specific start process is as follows:
1) the circuit of the control power supply is connected to provide the DC 110 V control power supply to the auxiliary inverters;
2) a central control unit is initialized in 3 seconds to complete system self-detection without faults;
3) it is detected that the auxiliary inverter start signal (APS START) is at the high level 1, or if the auxiliary inverter start signal (APS START) is at the low level 0, the start process is stopped;
4) a contactor KM2 is closed for pre-charging, which lasts for 1 s after the terminal voltage of the capacitor reaches DC 1000 V, then KM1 is closed, and the pre-charging is completed; and
5) after KM1 is closed, KM2 is opened for 1 s; and the APS is started after 3 s delay.

A normally-open contact state signal of the APSSR1 relay is transmitted to the network through a hard wire for state monitoring.

When the operation of the auxiliary inverters is to be stopped, the auxiliary inverter start-stop switch APSS at either end is switched to the "off" position, the APS stop train line TL2 is electrified, the APS stop relays APSOR1 in the cabs at both ends are electrified and the corresponding normally-closed auxiliary contacts APSOR1-1 and APSOR-2 of the auxiliary inverters are disconnected, the APS start train line TL1 is not electrified; the APS START signal is not electrified, the auxiliary inverters APS stops running, and the indicator lamp (L1) on the driver console goes off.

A normally-open auxiliary contact state signal of the APSOR1 relay is transmitted to the network through a hard wire for state monitoring.

The dual start control circuit for auxiliary inverters can control the start and stop of the auxiliary inverters in the cabs at both ends, and it is universally applicable in different railway vehicle projects, and will be widely used in future rail transit vehicle platforms.

In addition to the embodiments described above, other embodiments of the invention are possible. All technical solutions formed by equivalent replacements or equivalent transformations fall within the protection scope of the present invention.

What is claimed is:

1. A dual start control circuit for auxiliary inverters of a railway vehicle, comprising
two units arranged in a front cab and a rear cab, respectively, and
an APS start train line (TL1) and an APS stop train line (TL2),
wherein the APS start train line (TL1) and the APS stop train line (TL2) are arranged throughout a vehicle,
each unit comprises an auxiliary inverter start switch (APSS), an APS start relay (APSSR1) and an APS stop relay (APSOR1), wherein
the auxiliary inverter start switch (APSS) is a self-reset three-position knob switch and is provided with on-position contacts (13, 14) and off-position contacts (23, 24),
the on-position contacts (13, 14) and the APS start relay (APSSR1) are connected in series to a train power supply,
the off-position contacts (23, 24) and the APS stop relay (APSOR1) are connected in series to the train power supply,
a terminal of the APS start train line (TL1) is connected to a negative pole of the train power supply via an input terminal of the APS start relay (APSSR1) and a load, and
a terminal of the APS stop train line (TL2) is connected to a circuit between the off-position contacts (23, 24) of the auxiliary inverter start switch (APSS) and the APS stop relay (APSOR1); and
normally-open contacts (APSR1-1, APSR1-2) of the APS start relay (APSR1) and normally-closed contacts (APSOR1-1, APSOR1-2) of the APS stop relay (APSOR1) are connected in series between a positive pole of the train power supply and the APS start train line (TL1), and
a start signal interface (APS START) of an auxiliary inverter (APS) is connected to the APS start train line (TL1).

2. The dual start control circuit according to claim 1, wherein the load is an indicator lamp (L1).

3. The dual start control circuit according to claim 1, wherein an APS start-stop control circuit breaker (APSSCB) is connected in series between the positive pole of the train power supply and the auxiliary inverter start switch (APSS), and between the positive pole of the train power supply and the normally-open contacts (APSSR1-1, APSSR1-2) of the APS start relay (APSSR1).

4. The dual start control circuit according to claim 3, further comprising a network monitoring module for monitoring states of the APS start relay (APSSR1) and the APS stop relay (APSOR1).

5. The dual start control circuit according to claim 4, wherein the network monitoring module is also used for monitoring a state of the APS start-stop control circuit breaker (APSSCB).

6. The dual start control circuit according to claim 5, wherein the APS start relay (APSSR1) has a normally-open contact (APSSR1-3) with two ends connected to the positive pole of the train power supply and the network monitoring module, respectively,
the APS stop relay (APSOR1) has a normally-closed contact (APSOR1-3) with two ends connected to the positive pole of the train power supply and the network monitoring module, respectively, and
the APS start-stop control circuit breaker (APSSCB) has an APS start-stop control circuit breaker auxiliary contact (APSSCB-1) with two ends connected to the positive pole of the train power supply and the network monitoring module, respectively.

7. The dual start control circuit according to claim 6, wherein
when the auxiliary inverter start switch (APSS) on a local side is turned to an "on" position, the APS start train line (TL1) is electrified, the APS start relays (APSSR1) at both ends of the vehicle are electrified and corresponding normally-open auxiliary contacts (APSSR1-1, APSSR1-2) are closed, the APS stop relay (APSOR1) is not electrified and corresponding normally-closed auxiliary contacts (APSOR1-1, APSOR1-2) of the APS stop relay (APSOR1) are kept closed, the APS start train line (TL1) is kept electrified, an indicator lamp (L1) on a driver console is kept illuminated, and
at a same time, an APS start train line signal is transmitted to the auxiliary inverters (APS) through a hard wire, and the auxiliary inverters (APS) receive the APS start train line signal to execute a start program.

8. The dual start control circuit according to claim 7, wherein
when an operation of the auxiliary inverters is to be stopped, the auxiliary inverter start switch (APSS) at either end is switched to an "off" position, the APS stop train line (TL2) is electrified, APS stop relays (APSOR1) in the front cab and the rear cab at both ends are electrified and the corresponding normally-closed auxiliary contacts (APSOR1-1, APSOR1-2) of the auxiliary inverters (APS) are disconnected, the APS start train line (TL1) is not electrified;

the APS start train line signal is not electrified, the auxiliary inverters (APS) stop running, and the indicator lamp (L1) on the driver console goes off.

9. The dual start control circuit according to claim 1, wherein the normally-open contacts (APSSR1-1, APSSR1-2) of the APS start relay (APSSR1) and the normally-closed contacts (APSOR1-1, APSOR1-2) of the APS stop relay (APSOR1) are connected in series to form a self-locking circuit, and the self-locking circuit adopts a double-contact parallel redundancy control.

10. A railway vehicle, comprising the dual start control circuit for the auxiliary inverters of the railway vehicle according to claim 1.

11. The railway vehicle according to claim 10, wherein the load is an indicator lamp (L1).

12. The railway vehicle according to claim 10, wherein an APS start-stop control circuit breaker (APSSCB) is connected in series between the positive pole of the train power supply and the auxiliary inverter start switch (APSS), and between the positive pole of the train power supply and the normally-open contacts (APSSR1-1, APSSR1-2) of the APS start relay (APSSR1).

13. The railway vehicle according to claim 12, further comprising a network monitoring module for monitoring states of the APS start relay (APSSR1) and the APS stop relay (APSOR1).

14. The railway vehicle according to claim 13, wherein the network monitoring module is also used for monitoring a state of the APS start-stop control circuit breaker (APSSCB).

15. The railway vehicle according to claim 14, wherein
the APS start relay (APSSR1) has a normally-open contact (APSSR1-3) with two ends connected to the positive pole of the train power supply and the network monitoring module, respectively,
the APS stop relay (APSOR1) has a normally-closed contact (APSOR1-3) with two ends connected to the positive pole of the train power supply and the network monitoring module, respectively, and
the APS start-stop control circuit breaker (APSSCB) has an APS start-stop control circuit breaker auxiliary contact (APSSCB-1) with two ends connected to the positive pole of the train power supply and the network monitoring module, respectively.

16. The railway vehicle according to claim 15, wherein
when the auxiliary inverter start switch (APSS) on a local side is turned to an "on" position, the APS start train line (TL1) is electrified, the APS start relays (APSSR1) at both ends of the vehicle are electrified and corresponding normally-open auxiliary contacts (APSSR1-1, APSSR1-2) are closed, the APS stop relay (APSOR1) is not electrified and corresponding normally-closed auxiliary contacts (APSOR1-1, APSOR1-2) of the APS stop relay (APSOR1) are kept closed, the APS start train line (TL1) is kept electrified, an indicator lamp (L1) on a driver console is kept illuminated, and
at a same time, an APS start train line signal is transmitted to the auxiliary inverters (APS) through a hard wire, and the auxiliary inverters (APS) receive the APS start train line signal to execute a start program.

17. The railway vehicle according to claim 16, wherein
when an operation of the auxiliary inverters is to be stopped, the auxiliary inverter start switch (APSS) at either end is switched to an "off" position, the APS stop train line (TL2) is electrified, APS stop relays (APSOR1) in the front cab and the rear cab at both ends are electrified and the corresponding normally-closed auxiliary contacts (APSOR1-1, APSOR1-2) of the auxiliary inverters are disconnected, the APS start train line (TL1) is not electrified;

the APS start train line signal is not electrified, the auxiliary inverters (APS) stops running, and the indicator lamp (L1) on the driver console goes off.

18. The railway vehicle according to claim 10, wherein the normally-open contacts (APSSR1-1, APSSR1-2) of the APS start relay (APSSR1) and the normally-closed contacts (APSOR1-1, APSOR1-2) of the APS stop relay (APSOR1) are connected in series to form a self-locking circuit, and the self-locking circuit adopts a double-contact parallel redundancy control.

* * * * *